Inventor
T. M. Davidson
by
W. E. Evans
Attorney.

Fig.6.(b)

Patented Nov. 10, 1931

1,831,704

UNITED STATES PATENT OFFICE

THOMAS MALCOLM DAVIDSON, OF HATCH END, ENGLAND

ROTARY RETORT FOR THE TREATMENT OF OIL SHALE AND THE LIKE

Application filed October 29, 1930, Serial No. 491,957, and in Great Britain October 17, 1929.

This invention relates to rotary retorts for the distillation of oil shale and other solid carbonaceous substances more especially for the recovery of oil, and has among its objects to provide a retort adapted for continuous withdrawal of the vapour and residue, the continuous removal of the tarry or carbonaceous deposit on its formation upon the wall of the retort, and the continuous separation of dust from the liberated vapours within the retort.

According to the invention, also, gastight joints are provided between the retort and the feed mechanism at the one end and the discharge chamber at the other end. Such joints are conveniently formed by providing concentrically disposed surfaces respectively on the rotary retort and the fixed element and fitting in a channel or groove in one of the said surfaces a plurality of split rings in which splits are staggered and which bear upon the other of the said surfaces and which are maintained in close contact and against the side of the channel or groove by a rubbing ring mounted in the channel or groove and applied against the split rings with pressure under the action of springs.

According to the invention, moreover, the gases and vapours of distillation are withdrawn from the retort by an outlet tube extending a suitable distance into the retort corresponding to that part in which the process of distillation proceeds and advantageously disposed eccentrically with reference to the axis of the retort.

According to the invention, moreover, there are provided reciprocating scrapers which have a relative movement in the circumferential direction with reference to the retort surface and are formed to an angular point such as to meet the surface of the retort at an obtuse angle and thus to remove deposit therefrom in a manner similar to that of a metal cutting tool.

According to the invention, moreover, the outlet tube may serve to receive a reciprocating carrier for the said scrapers which may thus be disposed aproximately at or adjacent the axis of the retort.

According to the invention, moreover, the said reciprocating carrier may be disposed forward of the outlet tube within a fixed casing which may be of tubular construction, and which may also serve for the support of reciprocating scrapers mounted upon the said carrier.

According to the invention, moreover, the said scraper carrier may be provided with auxiliary scraping devices adapted to maintain the interior of the outlet tube and the casing of the scraper carrier free of dust that may tend to accumulate therein.

According to the invention, also, the feed end of the retort may advantageously be provided with a water vapour offtake tube disposed co-axially and extending through the feed mechanism to the exterior for connection to a conduit or the like whereby the water vapour may be withdrawn.

According to the invention, moreover, the residue of distillation may be utilized in the heating furnace applied to the retort, and for this purpose the residue may be delivered from the discharge chamber by way of a pipe or conduit leading to the said furnace and controlled by means of discharge valves adapted to break the communication with the retort at, for example, two points.

According to the invention, moreover, the said valves may be provided as power-actuated slide valves of a construction such that when approaching the closed position they are moved in the direction of, and applied to, the respective seats with a pressure which increases with the forward movement of the valve.

The invention further comprises the details of construction which are hereinafter set forth.

A construction of retort and retort setting according to the invention is illustrated in the accompanying diagrammatic drawings, by way of example.

Figures 1 (parts $a$ and $b$), 2, 3 and 4 are respectively side elevation, plan, and elevations from opposite ends respectively of retort and setting, partly in section in the first two figures.

Figures 5 and 6 (parts $a$ and $b$) are enlarged transverse and longitudinal sections of the retort.

Figures 7 and 8 are detail transverse sections of scrapers for freeing the vapour outlet tube of dust.

Figures 9 and 10 are sectional views of the gas tight joints provided at the respective ends of the retort.

Figure 2:
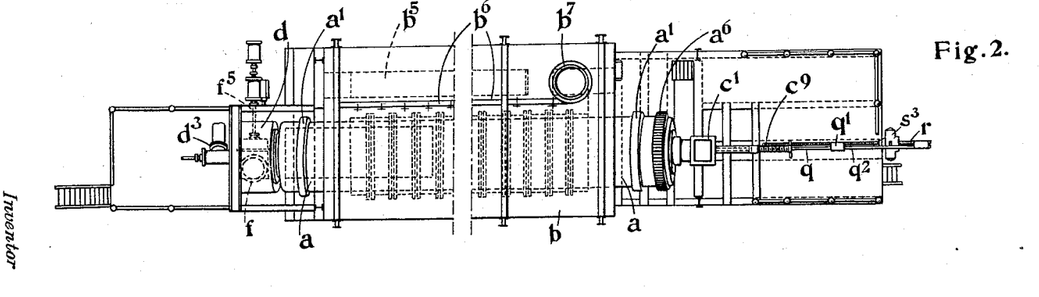
Figure 3:
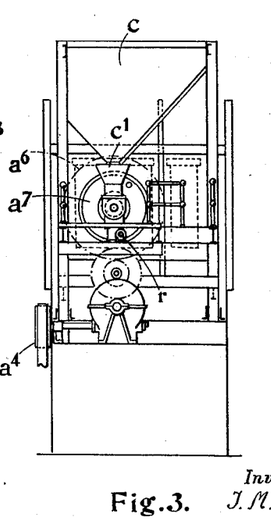

In carrying the invention into effect the rotary retort $a$ is mounted within a corresponding cylindrical heating chamber $b^1$ within a setting $b$, at an inclination of, say, 1 in 120 downwards towards the discharge end at which is provided a heating furnace $b^2$ supplied with fuel by a mechanical stoking device $b^3$, to which combustible gas may also be supplied by a supply pipe $b^4$. The heating gases pass upward from the furnace $b^2$ into one end of a longitudinal flue $b^5$ disposed adjacent and parallel with the heating chamber $b^1$, and transversely disposed ports or passages indicated in Figure 2 by centre lines are provided in the setting wall between the flue $b^5$ and the chamber $b^1$ which may be respectively coextensive, the flow of the heating gases through the ports or passages being controlled by vertical dampers, not shown. The control rods of the dampers may be adjustably secured to a longitudinally disposed angle member $b^6$, according to the extent of opening of each damper as desired; while at the charging end the chamber $b^1$ communicates with a chimney $b^7$ for the discharge of the waste heating gases. Means may be provided to deliver the ash or residue through a discharge outlet at $b^8$ disposed in a position beside the furnace $b^2$ and beneath the setting.

The retort $a$ may rotate upon bearing rings $a^1$ supported by and between bearing rollers $a^2$ at two or more positions while at the discharge end rollers $a^3$ disposed upon axes normal to the axis of the retort are provided to bear upon the adjacent bearing ring and to resist longitudinal thrust. The retort may be rotated by an electric motor through worm gear $a^4$, reduction gearing $a^5$ and a toothed ring $a^6$ mounted at the charging end of the retort.

For charging the retort there is provided a bunker $c$ from which the charge of shale or the like is fed into a hopper $c^1$ thence into a stationary cylinder $c^2$ within which is disposed a feed worm $c^3$ mounted upon a hollow shaft. The feed worm is rotated by suitable gearing (not shown) to permit axial movement of the feed shaft for regulation of the feed, effected for example, by means of a hand-operated adjusting screw and nut, as at $c^9$.

Figures 5, 7, 8, 9, 10:
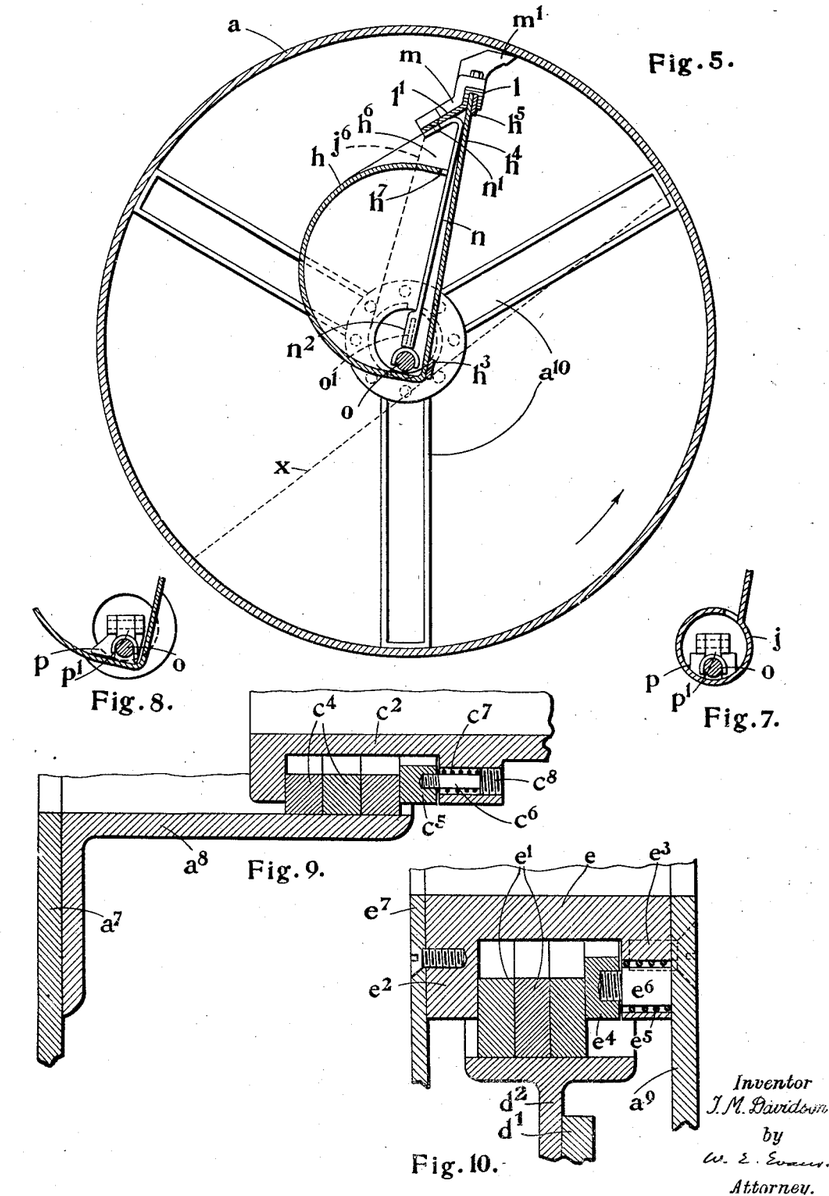

At the feed end the retort is closed by a disc $a^7$ (Figures 1 and 6) having a central aperture fitted with an outwardly extending cylindrical flange $a^8$ (Figure 9), into which the feed cylinder $c^2$ may extend, and a gas-tight fit is provided by a number of concentric split rings $c^4$ fitting within the cylindrical flange $a^8$ and confined between one shoulder or flange of a groove upon the exterior of the feed cylinder $c^2$, and a rubbing ring $c^5$ mounted upon the other shoulder or flange of the groove by means of a number of pins $c^6$ supported in equi-distant positions upon the rubbing ring which are received into corresponding holes provided in determined position parallel with the axis of the cylinder and formed in the said shoulder, the rubbing ring $c^5$ being maintained in contact with the split rings $c^4$ by the helical springs $c^7$ compressed by screw-threaded plugs $c^8$ inserted within the said shoulder or flange from the outer side.

The stationary discharge casing $d$ (Figure 6) is of a diameter corresponding with that of the retort, and a gas-tight joint is similarly made between the retort and the casing $d$. Thus, the casing $d$ has an integral annular flange $d^1$ (Figure 10) carrying a ring $d^2$ of T-cross-section to form a cylindrical surface to support a number of concentric split rings $e^1$ which are confined between a flange $e^2$ upon a ring $e$ secured by a second flange $e^3$ to an integral annular end flange $a^9$ of the retort $a$. A rubbing ring $e^4$ is disposed between the flange $e^3$ and the split rings and is maintained in contact by helical springs $e^5$ seated within holes formed in the said flange and upon pins $e^6$, set in equi-distant positions upon the ring $e^4$. Upon the flange $e^2$ of the ring $e$ a plate $e^7$ is provided to extend to a position near the peripheral wall of the casing $d$. By such means it will be understood that relative movement is possible between the cylinder $c^2$ and the cylindrical flange $a^8$ as well as between the end of the retort $a$ and the stationary casing $d$ for the accommodation of extension and contraction of the retort, and that by means of the ring $e$ an annular space is provided to surround the vapour outlet pipe $h$ so that thus in the rotation of the retort $a$ the charge on passing through the stationary feed cylinder $c^2$ passes into the charging end of the retort and in the rotation of the retort in the direction of the arrow (Figure 5) the charge lies substantially in the position indicated by the line $x$ in that figure, and thus owing to the downward inclination of the retort the charge eventually finds its way through the ring $e$ into the stationary cylinder $d$ whence it passes through the discharge outlet pipe $f$. The vapours produced pass through the bearing ring $k$ and into the tubular casing $j$ and the outlet pipe $h$ through an aperture $h^2$, the vapour also passing through the bearing ring $i$ to the outer end of the vapour outlet tube $h$ through to the vapour offtake fitting $d^3$.

Figures 11, 13:
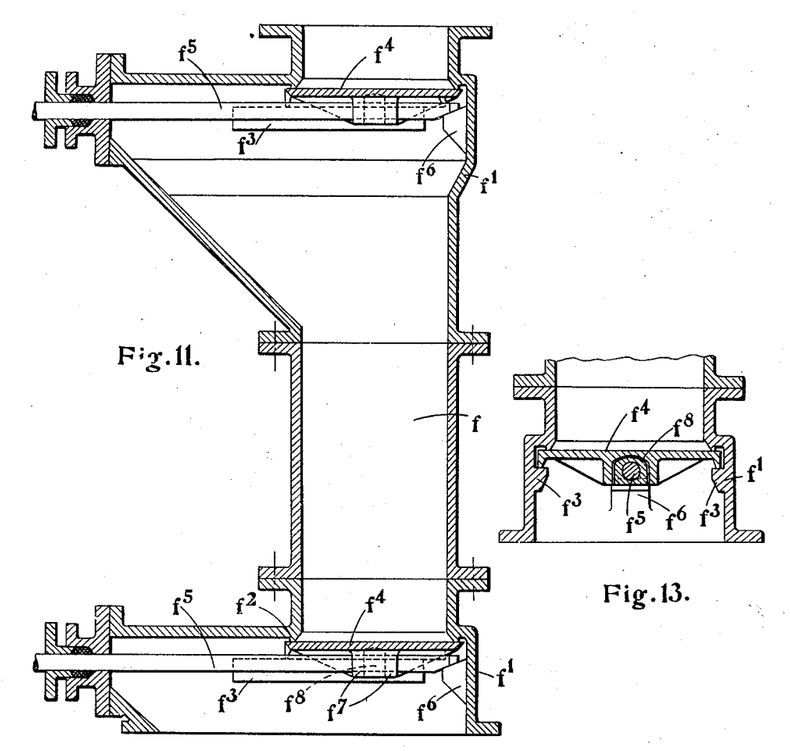
Figures 11, 12 and 13 are corresponding sectional views of the residue outlet valves.
Figure 12:
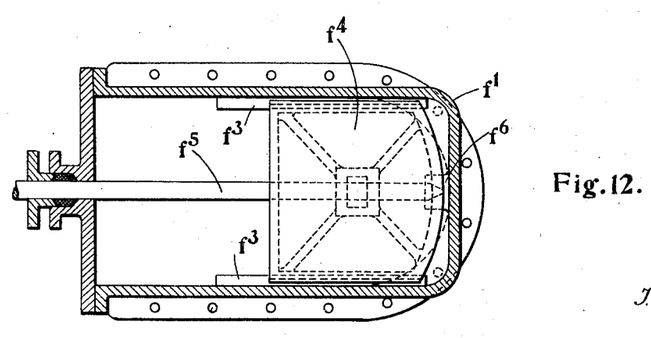

The discharge pipe $f$ is provided with duplicate discharge valves $f^4$ (Figures 11 to 13) leading to the discharge chamber beside the furnace $b^2$. Each of the said valves comprises a substantially rectangular casing $f^1$ horizontally disposed and extending laterally of the said pipe or conduit. A valve seating $f^2$ is provided co-axial with the pipe or conduit and guideways $f^3$ for the slide valve are provided on opposite sides of the casing. The slide valves $f^4$, which are advantageously of square form, are mounted to slide upon the said guideways $f^3$ and are provided to engage with operating rods $f^5$ extending outwardly from the casings through suitable glands for connection to mechanical or hydraulic operating gear. In order that the valves may move freely from the seats and at the same time be pressed firmly thereon in the closed position, the ends of the operating rods $f^5$ are extended beyond the point of engagement with the valve, and the extremity is formed with an inclined surface on the lower side, which when the valve arrives at the position of closure engages a corresponding inclined surface formed on a lug $f^6$ provided upon the wall of the casing in such manner that the operating rod is caused to rise, and thus to apply the valve with pressure upon the seat. The connection of the valve with the operating rod is conveniently effected by providing the rod with a screw-threaded portion which is disposed loosely within coincident borings provided in a pair of lugs $f^7$ on the underside of the valve and which is engaged by a nut or screwed collar $f^8$ disposed between the said lugs and forming the means for transferring the movement of the rod to the valve.

Figure 1:
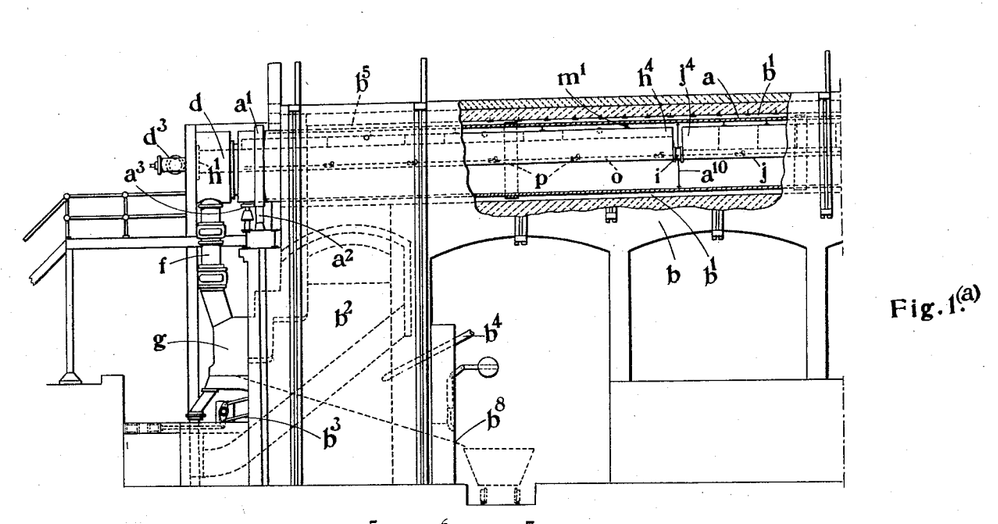
Figure 1B:
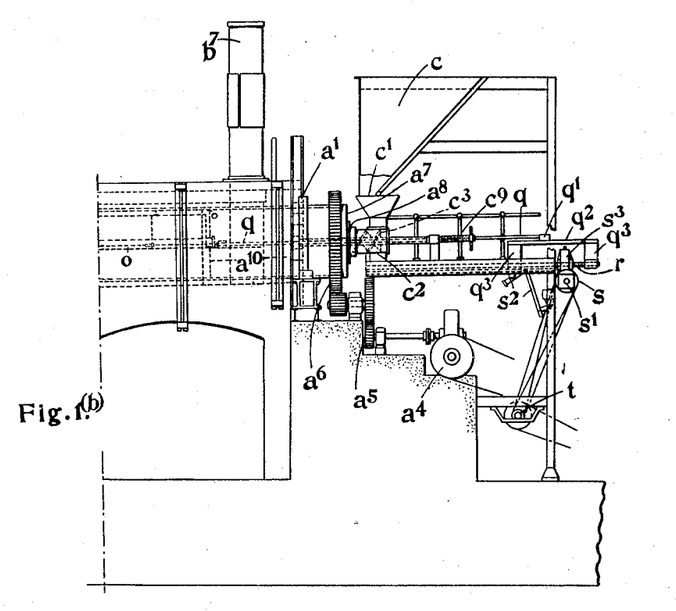
Figure 4:
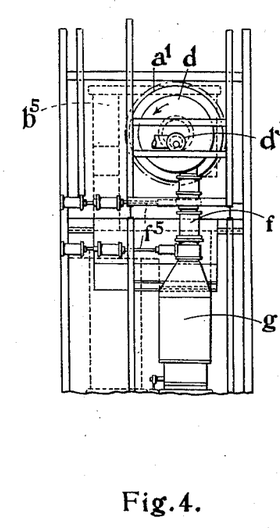

The discharge pipe or conduit $f$ at the point beyond the discharge valves is suitably connected to a stoker bunker $g$ (Figures 1 and 4) disposed in a convenient position with reference to the mechanical stoker provided in the furnace.

Figure 6:
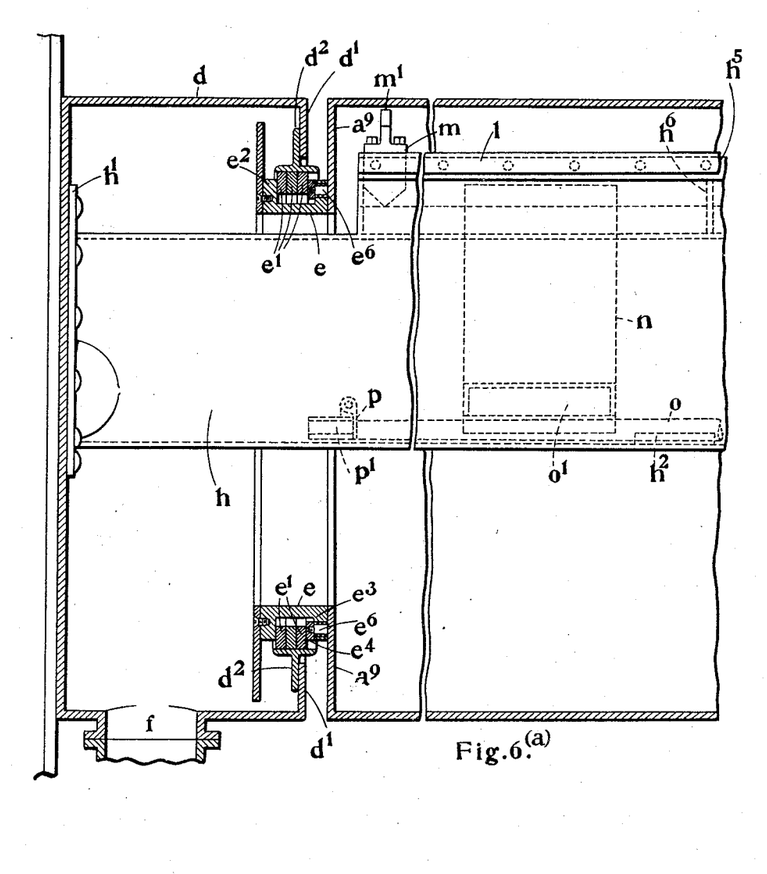

The gas or vapour outlet tube $h$ (Figures 5 and 6) is conveniently provided of a cross-section which approximates to a semi-circle with a rectangular extension on the outer side of the diameter. The axis of the tube represented by the centre of the semi-circle is advantageously disposed vertically above the axis of the retort $a$, and the diameter is inclined to the vertical through an angle of, say, 15° more or less in the direction opposite to that of the rotation of the retort and so that the flat side is disposed to that side of the retort where the charge tends to gather. At the discharge end the tube is fitted with a flange or plate $h^1$ by which it is mounted in position upon the interior of the end wall of the discharge chamber $d$, which at the exterior is provided with a centrally disposed vapour offtake fitting $d^3$ which may be provided with a controlling valve, and is advantageously connected to a dust collector by which dust may be extracted from the discharge gases and vapours. The cross-section of the gas or vapour outlet tube adjacent the flange or plate $h^1$ is advantageously modified to provide an easy passage for the gases to the centrally disposed offtake fitting $d^3$. The vapour outlet tube advantageously extends into the retort to a distance of approximately half the length of the retort, where it is supported by a hollow cylindrical bearing or fitting $i$ rotatably fitted within a supporting spider $a^{10}$ mounted within the retort, the end of the outlet tube being suitably closed and fitted for connection to the said bearing. Forward of the gas or vapour outlet tube and extending two-thirds of the remaining part of the length of the retort, there is provided a tubular casing $j$ of a cross-section corresponding with that of the bearing $i$ with which it is conveniently engaged by means of dog teeth $j'$ engaging corresponding recesses formed in the adjacent end of the bearing $i$ and by means of a flange $j^2$ which is engaged with a screwed flange or collar $i^1$ fitted on the exterior of the bearing. At the forward end the tubular casing $j$ is provided with a flange $j^3$ for engagement with a similar bearing $k$ which again is rotatably supported within a spider $a^{10}$ secured to the retort.

The gas or vapour outlet tube which is situated eccentrically in relation to the retort is provided in the lowermost portion thereof with a gas offtake opening or slot $h^2$ at about 20 feet from the discharge end or a distance from the discharge end equal to approximately one third of the total length of the retort. The lowermost portion of the flat face of the vapour outlet tube is advantageously strengthened by means of a bar or strip $h^3$ of metal extending the full length of the tube and welded thereto. The flat portion of the vapour outlet tube is further advantageously extended upward from the forward end and for the greater part of its length at $h^4$ to form a supporting member for the scrapers which are applied to the inner face of the retort. The upper edge of the said extension is strengthened on the outer side by means of a length of strip metal $h^5$ extending the full length of the extension. The tubular casing $j$ is similarly provided with an upwardly extending extension or plate $j^4$ in line with that of the gas or vapour outlet tube and extending in conformity therewith, the upper edge being similarly strengthened at $j^5$. At suitable points along the length of the vapour outlet tube and the tubular casing there are provided, upon the inner side of the extensions, web plates $h^6$, $j^6$ serving to give rigidity to the whole.

Scraper carrying plates $l$ are slidably mounted upon the upper edges of the extensions of the vapour outlet tube and the tubular casing $j$, and comprise respectively lengths of plating that are formed to a U-shaped cross-section to fit over the slide upon the upper edge of the said extensions with a rearwardly and downwardly projecting portion $l^1$ inclining towards the said outlet tube and tubular casing. At intervals along the length of the said plates there are mounted, by means of screws, rivets or bolts, the scrapers $m$, each comprising a body of a form to fit upon the upper surface of the carrying plate $l$ and having a blade $m^1$ extending upwardly and forwardly for engagement with the inner surface of the retort, with which it forms an obtuse angle, the body being substantially of plate form with the blade extending therefrom in the form of a web, and the rearmost portion of the body being advantageously cut or formed to an angular point which is received upon the rearwardly extending portion of the carrying plate.

Each of the scraper-carrying plates $l$ is adapted to be reciprocated along the extension of the outlet tube $h$ or of the tubular casing $j$ by means of a rectangular plate member $n$ which is disposed to the rear of the said extensions and extends, in a direction nearly parallel to the flat sides of the said tube and casing, into the outlet tube or tubular casing through a suitable slot, as at $h^7$, in the upper surface of a sufficient length to permit the necessary reciprocation of the said plate. The upper edge of the plate $n$ is bent or formed rearwardly, as at $n^1$, to an inclination corresponding with the downward inclination of the scraper-carrying plate $l$ to which the plate member is secured by bolts or rivets.

For effecting the reciprocation of the scrapers there is carried upon the lower face of the outlet tube and the tubular casing, a rod $o$ which is reciprocated by suitable mechanism, disposed at the feed end of the retort. This rod has welded to it at suitable positions radially disposed web or fin plates $o^1$ comprising a length of strip metal mounted upon a U-shaped saddle adapted to fit upon the rod. The said web plates are adapted to be engaged by the plate members $n$ before referred to and for the purpose the lower edges of the plate member $n$ are thickened, at $n^2$, as by the welding of a second thickness of material thereto, for the formation of a recess or pocket into which the web plate $o^1$ before referred to may be received.

The reciprocating rod $o$ further serves to carry a series of scraper devices adapted in the reciprocation of the rod to move over the lower surface of the vapour outlet tube and the tubular casing respectively. Each of such scraper devices conveniently comprises a saddle $p^1$ welded to the rod $o$ and having at one end an upstanding lug to which is pivoted a scraping blade $p$ or blades extending transversely and having the lower edges conforming in shape to the curvature of the lower inner surface of the outlet tube or tubular casing. Such scrapers of such form are pivoted upon the said lugs in such manner as to be capable of swinging in the axial direction of the rod in its movement in the one direction, and thus to pass over the dust or the like accumulating at the bottom of the outlet tube or tubular casing, and to be maintained in the operative position by contacting with the adjacent end of the saddle $p^1$, in the movement of the rod in the other direction and thus to serve to effect the removal of the dust at the outer end of the outlet tube or the tubular casing or through orifices intermediate the said ends. They may be adapted to feed the dust all in one direction or some in one direction and some in the other direction. At the forward end of the rod $o$, which projects beyond the forward bearing $k$ at the forward end of the tubular casing, there is mounted a block $o^2$ by which a connection may be made with an operating rod $q$ axially disposed with reference to the retort and extending outwardly through the hollow shaft of the feed worm $c^3$. The said block is conveniently mounted in position upon the reciprocating rod $o$ by the formation of flats upon the rod which engage corresponding surfaces in a U-shaped recess in the bottom of the block, the block being secured in position by means of a bolt or set screw $o^3$, while connection with the operating rod may be effected by a screw-thread provided upon the rod which engages a screw-threaded bore in the block.

The operating rod $q$ is extended sufficiently beyond the hollow shaft of the feed mechanism to permit its reciprocation to the extent necessary for the reciprocation of the scrapers. It is connected by such means as a cross head $q^1$ (Figures 1 and 2) to a frame $q^2$ having two downwardly extending arms or supports $q^3$, at the lower ends of which are provided nuts or clamps secured to a screw-threaded rod or shaft $r$ adapted to be engaged with a nut in the form of a pinion or the like contained in a casing $s^3$ and that is rotated by such means as a worm drive $s$. Such drive receives movement from a shaft $s^1$ which is driven through two fixed pulleys and a loose pulley by way of a crossed and an open belt from a suitable driving shaft $t$. When the operating rod $q$ has been advanced to the end of its travel in one direction, the direction of rotation of the worm gear is reversed automatically by such means as a tripping mechanism $s^2$ serving to throw over the driving belts and actuated, for example, by one of the arms or supports $q^3$.

It will be understood that the invention is not limited to the particular details of construction which are hereinbefore described, since these are given merely by way of illustration and are subject to variation according to the requirements of particular applications of the invention. It is, however, essential that in all constructions of the scraping mechanism the scrapers should be of a form such that the operative edge or surface forms an obtuse angle with the surface of the retort so that the deposit upon the surface is removed in a manner similar to that which applies in the use of a tool for cutting metal.

I claim:

1. A cylindrical retort mounted for rotation about its axis, a gas and vapor outlet tube mounted within said retort and fixed against rotation therewith, said vapor outlet tube being longitudinally slotted and having a flattened portion extending adjacent the slot and longitudinally of said retort, scraper blades adapted to engage the inner surface of said retort having guiding means slidably engaging the flattened portion of said vapor outlet tube, and means for reciprocating said scraper blades on said flattened surface longitudinally of said retort comprising a member mounted to reciprocate within said vapor outlet tube and having a carrier for the blades extending through the slot in said tube.

2. A retort according to claim 1, comprising a series of scraper devices mounted within the gas and vapor outlet tube and adapted to engage the inner surface thereof, and means operatively connecting said scraper devices to the member mounted to reciprocate within said tube.

3. A rotary retort for the treatment of oil shale and other solid carbonaceous substances, comprising a tubular body mounted for rotation about its axis, a stationary feed mechanism therefor at one end of said body, a stationary discharge chamber for said tubular body at the other end of said body, the feed mechanism and discharge chamber making gas tight joints with the said body, a gas and vapor outlet tube mounted within said retort and fixed against rotation therewith, said vapor outlet tube being longitudinally slotted and having a flattened portion extending adjacent the slot and longitudinally of said retort, scraper blades adapted to engage the inner surface of said retort having guiding means slidably engaging the flattened portion of said vapor outlet tube, and means for reciprocating said scraper blades on the flattened portion of said outlet tube longitudinally of said tubular body, comprising a member mounted to reciprocate within said vapor outlet tube and having a carrier for the blades extending through the slot in said tube.

THOMAS MALCOLM DAVIDSON.